United States Patent
Brandwine (10) Patent No.: US 9,032,217 B1
(45) Date of Patent: May 12, 2015

(54) DEVICE-SPECIFIC TOKENS FOR AUTHENTICATION

(75) Inventor: Eric Jason Brandwine, Haymarket, VA (US)

(73) Assignee: Amazon Technologies, Inc., Reno, NV (US)

( * ) Notice: Subject to any disclaimer, the term of this patent is extended or adjusted under 35 U.S.C. 154(b) by 98 days.

(21) Appl. No.: 13/432,805

(22) Filed: Mar. 28, 2012

(51) Int. Cl.
  *G06F 21/00* (2013.01)
  *G06F 21/44* (2013.01)
  *G06F 21/64* (2013.01)

(52) U.S. Cl.
  CPC .............. *G06F 21/44* (2013.01); *G06F 21/64* (2013.01)

(58) Field of Classification Search
  CPC .................................. G06F 21/44; G06F 21/64
  USPC .......................................................... 713/185
  See application file for complete search history.

(56) References Cited

U.S. PATENT DOCUMENTS

| | | | | |
|---|---|---|---|---|
| 6,396,916 B2 * | 5/2002 | Jordan | ........................... | 379/189 |
| 2001/0045451 A1 * | 11/2001 | Tan et al. | ....................... | 235/375 |
| 2010/0208706 A1 * | 8/2010 | Hirano et al. | ................. | 370/332 |
| 2010/0327054 A1 * | 12/2010 | Hammad | ....................... | 235/375 |
| 2011/0288940 A1 * | 11/2011 | Horadan et al. | ............ | 705/14.69 |
| 2012/0144501 A1 * | 6/2012 | Vangpat et al. | .................. | 726/28 |

\* cited by examiner

*Primary Examiner* — Peter Shaw
(74) *Attorney, Agent, or Firm* — Novak Druce Connolly Bove + Quigg LLP (57) ABSTRACT

A user who is authenticated to a system or service across a network can receive a token that includes a device fingerprint. The fingerprint can include information that is obtained from the client device through which the user supplied authentication credentials. The client device can be configured to include that token with subsequent requests. When a request is received, the information in the fingerprint can be extracted from the token and compared to information obtained from the device submitting that request. If the information matches within at least an allowable match threshold, for example, the request can be processed. If the information in the fingerprint does not match the current values of the device from which the request was received, the request can be denied or a remedial action performed.

28 Claims, 4 Drawing Sheets

DEVICE-SPECIFIC TOKENS FOR AUTHENTICATION

BACKGROUND

People are performing an increasing number and variety of tasks electronically. Many of these tasks involve sending requests to resources available across a network, such as the Internet. In order to ensure that a request is submitted by a user authorized to access a resource, or specific actions or data available through those resources, the user submitting the request often has to be authenticated to a system providing the resource. In many cases, this involves a user providing some type of credential, such as a username and password pair. In order to prevent the user from repeatedly having to enter these credentials, and the system or service from repeatedly having to validate these credentials, a token can be created for the user that can be provided with subsequent requests on a user session. When the system receives a request with a valid token for a particular user, the system can proceed to process the request. A potential downside to such an approach, however, is that any third party obtaining a copy of the token can also submit requests that appear to be valid requests from the user based on the token being included.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure overcome one or more of the above-referenced and other deficiencies in conventional approaches to authentication in an electronic environment. In particular, various embodiments provide a token to a user that includes a device-specific fingerprint. When a user provides authenticating credentials from a particular computing device, various information can be determined about that computing device, as may be exposed through a Web browser executing on the computing device. Upon authenticating an identity of the user, at least a portion of the information determined about the computing device through which the user was authenticated can be combined, using one or more fingerprinting algorithms, into a fingerprint that is specific to the device. This token can be provided to the user (or computing device) to be submitted with other requests for that user. Upon receiving a request from the user including a token, the fingerprint information can be extracted and analyzed to ensure that the fingerprint is in the proper format. Information about the client device that sent the request also can be determined and compared against the information in the fingerprint. If the information in the fingerprint matches the sending client device, and any other information for the request is valid, the request can be processed on behalf of the user.

Various other applications, processes and uses are presented below with respect to the various embodiments.

Figure 1:
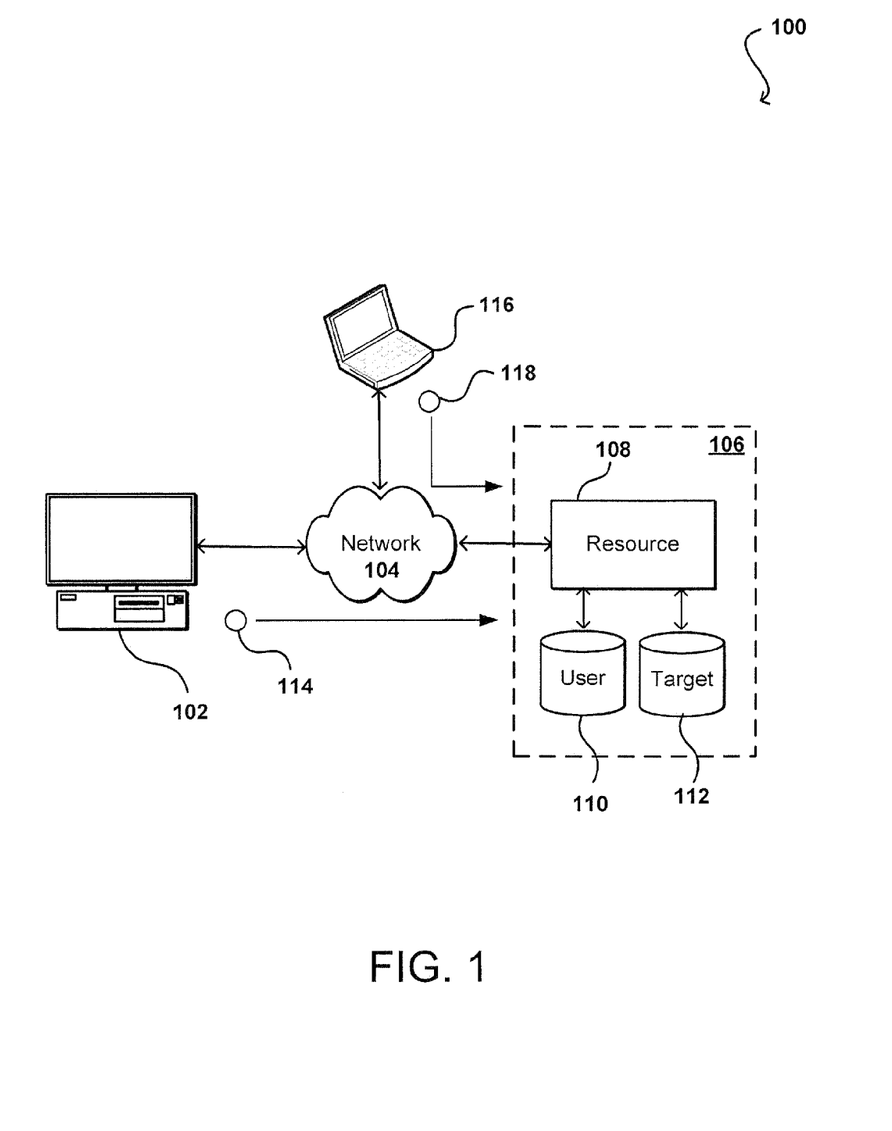
FIG. 1 illustrates a first example environment in which aspects of the various embodiments can be implemented.

FIG. 1 illustrates an example environment 100 in which aspects of the various embodiments can be implemented. In this example a user is able to utilize a client device 102 to submit requests across at least one network 104 to a resource provider environment 108. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 104 can include any appropriate network, including an intranet, the Internet, a cellular network, a local area network (LAN), or any other such network or combination, and communication over the network can be enabled via wired and/or wireless connections. The resource provider environment 106 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

As mentioned above, it is often the case that such a provider will want to authenticate an identity of the user causing a request to be submitted from a client device 102 in order to control who as access to one or more resources 108 available through the provider environment. The provider also might want to authenticate a user before granting access to data stored in one or more data stores 110, 112 that might be a target of the request. A user can provide any of various types of credentials in order to authenticate an identity of the user to the provider. These credentials can include, for example, a username and password pair, biometric data, a digital signature, or other such information. The provider can validate this information against information stored for the user, and if valid can determine to process the request.

Once a user is authenticated, a user session can be initiated on the provider environment 106. A component of the provider environment can generate a token and provide that token to the client device 102. When the client device submits a subsequent request, the client device 102 can cause a copy of the token 114 to be submitted with the request. When a component of the provider environment 106 receives the request, the component can analyze the token to ensure that the token includes valid information (e.g., for a valid session for the user associated with the request), and if so can cause the request to be processed.

In at least some embodiments, a token can include information (e.g., metadata) that can be signed and encrypted by the provider system. The user or client device generally will be unable to decrypt the token, and will not have any idea what is in the token or how the information is formatted. The signature also can include at least one integrity check to ensure that the signature has not been tampered with. When a request is received that includes the token, the provider system or service can decrypt the token and check the signature to obtain session information that the system trusts as being valid. The session information can include session credentials, such as an access key identifier, resource-specific information, or other such credentials, that enable a user to obtain access to certain resources or functionality.

A potential downside to such an approach, however, is that any person or component having access to a copy of the token can also potentially impersonate that user. For example, a component of the provider environment 106 might receive and validate the token, then make calls on the user's behalf. A person having access to that component can potentially control what is done with those calls. Similarly, a third party user accessing a copy of the token at a third party device 116 can cause requests to be submitted that include a copy of the token 118, such that the resource environment may determine that the request is a valid request from the user on the session and may process the request.

In at least some embodiments there can be restrictions included in the tokens, which can limit what can be done with the sessions. For example, there can be time limits for the session or token, restrictions on an IP address from which requests can be received, restrictions on APIs or other interfaces that are able to receive requests on the session, and the like. A user often will not change client IP addresses on a session, but when changing devices the user will generally be required to re-authenticate using that new device. A hacker or other unauthorized third party gaining access to that user's device, however, could make API calls using that device in order to meet the API and IP restrictions.

Approaches in accordance with various embodiments can increase the difficulty in impersonating a user on a client session by utilizing information that is specific to the client device through which the user was authenticated. An application such as a Web browser executing on a client device can access various types of information that is exposed to the Web browser by the client device. This information can include, for example, the type and version of the browser, the current time zone the device is in, the type and version of operating system executing on the device, information about graphics capabilities of the device, and the like. When a user submits information through a client device that causes the identity of the user to be authenticated, an assortment of information for that client device can be stored to a token as a device fingerprint. When a subsequent request is received on that session, the information for the device submitting the request can be compared against the information in the device fingerprint. If the information in the fingerprint matches the information for the device at least within an acceptable matching threshold, the request can be processed as being valid for the session. Certain amounts of deviation in the device information might be allowed, such as where the user passes between time zones, upgrades software on the device during a session, etc. Further, information for devices associated with the user can be stored between sessions to determine whether a request for a new session is received from a device that has not previously been associated with a user, which might potentially increase the information needed to authenticate the user.

In some embodiments, a Web server or other such component receiving a request can request information from the device in order to fingerprint the device or determine information to compare against an existing fingerprint. Thus, if a third party attempts to use the token from another device, the device information in the fingerprint will not match the information for the other device and the request can be denied or otherwise handled as a suspicious, malicious, or invalid request. While such information exposed by the client device might be able to be accessed by a third party as well, the third party may not be able to determine the selection, ordering, or format of the information in the fingerprint, such that even having the information for the device might not enable a third party to fake a token for a session. Further, even if a third party gains access to a client device, the third party would have to use the same browser application to access the session, and could not use other software executing on, or in communication with, the client device. In at least some embodiments, an alarm or notification can be generated on any mismatches, which can help to detect fraudulent requests before they are processed and can potentially help to locate malicious third parties as well.

Figure 2:
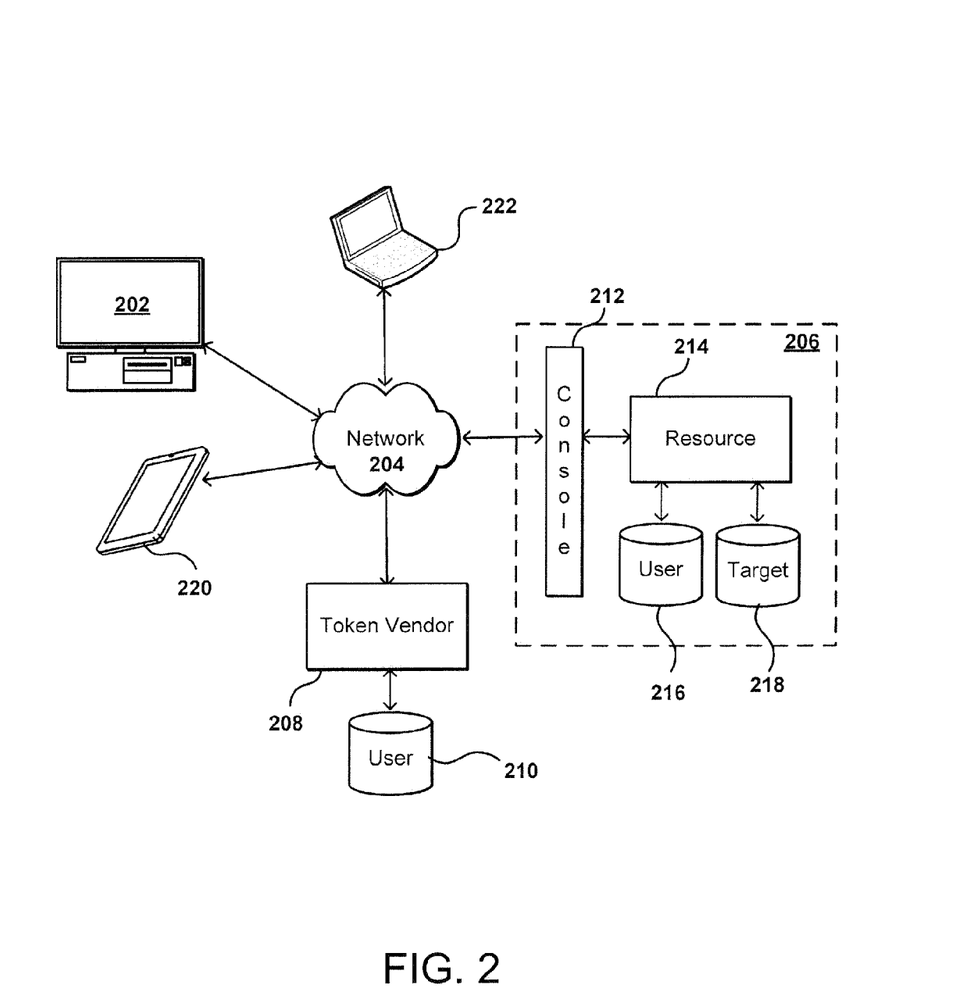
FIG. 2 illustrates a second example environment in which aspects of the various embodiments can be implemented.

FIG. 2 illustrates another example environment 200 in which aspects of various embodiments can be implemented. In this example, the user is again able to utilize a client device 202 to access a resource provider environment 206 across at least one network 204. In this example, the user is able to submit a request that is received by a Web console 212 or other such interface of the provider environment 206. When a request is received for a new session, information for the request can be directed to a token vendor 208 or other such system or service for generating a token including fingerprint information specific to the client device 202. Although the token vendor 208 is illustrated to be part of a separate system or service in this example, it should be understood that the token vendor can be inside, or otherwise associated with, the provider environment 206 as well in other embodiments. The user can provide credentials, such as username and password, to the Web console 212 or token vendor 208, for example, and upon authentication the token vendor can request information from the client device, if not previously submitted with the request or otherwise obtained. In some embodiments the token will store information for the user or client device in an appropriate data store 210 for subsequent comparison, and can provide the token to the client device 202 or to the Web console 212 for transmission to the client device 202 with other information for the session, such as an access identifier and one or more session credentials. A browser executing on the client device 202 then can use the session information and token to sign requests or calls on behalf of the customer.

In one embodiment the user can cause the client device 202 to submit information enabling the user to be authenticated to the Web console 212 or another appropriate component of a provider environment or system. Upon authentication, the Web console 212 can send a request to a token vendor system 208 that is operable to submit a request to obtain device specific information from the client device 202. As mentioned, this can include information such as the browser version, OS version, installed applications and versions of those applications, plug-ins installed, graphics capabilities, location, time zone, current keyboard map, screen size, and other such information that is specific to the client device 202. Other information that is exposed to a browser application (or other such component or module) can be used as well as should be apparent in light of the present disclosure. In some embodiments the fingerprint can include a set of key-value pairs, where a pair can include a type of information and the value of that information. The ordering and selection of the types of information can vary by provider and/or over time. In at least some embodiments the ordering and/or selection is not publicly exposed, such that malicious third parties cannot easily determine how to fake a valid token.

When the client device submits a subsequent request to the provider environment 206, the Web console 212 can extract the token and can attempt to validate information in the token, whether directly, by using another component of the provider environment, or by sending the token to the token vendor 208 for validation. In some embodiments the Web console might again request information about the client device from which the subsequent request was received in order to authenticate the request. If the client-specific information matches the client device that submitted the request, and any other necessary and valid session-specific information was provided as well, the request can be processed in the provider environment, such as by forwarding information for the request to at least one resource 214 of the provider environment able to access user and/or target data in at least one data store 216, 218 to process the request. In at least some embodiments there can be embedded sessions or sub-sessions within a user session, where those sub-sessions are associated with specific tasks or resources, for example. Accordingly, a request for one or those sub-sessions may have to provide information that is specific to those sub-sessions. A user session might have a relatively long life span, such as up to thirty-six hours in one embodiment, but the embedded sessions might have lifetimes on the order of minutes, seconds, or less.

In some embodiments a user might switch to a different client device 220 during a client session, such as by switching to a mobile device when the user leaves home. In at least some embodiments, the user will have to separately enter or provide authentication credentials through this device. Accordingly, a second device-specific fingerprint can be generated and included in a token that is provided to the second client device 220. In some embodiments the creation of an active token for a second device can cause the first token for the first device to become invalidated, although in other embodiments both tokens can remain active until their respective end times or another such criterion is reached. Thus, a user can have to be separately authenticated through each device the user intends to use with the provider environment, and specific fingerprints and/or tokens provided for each.

As discussed, a malicious user attempting to utilize one of these tokens with a different device 222 will have the requests denied or otherwise handled as the information for the device 222 will not match the device-specific information in either fingerprint.

As mentioned above, there might be some amount of mismatch that is allowed when determining whether to process a request. For example, a user might move to a different time zone, move to a different location, connect through a different network, install or uninstall software, change versions of a particular software program, connect or disconnect a peripheral device, and the like. In at least some embodiments it may be undesirable to have a user resubmit credentials any time the user performs any of these or similar actions during a session. Accordingly there can be some allowance made for changes to a device. There also can be different types of allowance granted. For example, a user might be able to plug in and unplug devices, or download additional software, without risking a denial of a request. A user also might be able to upgrade a version of one or two software packages at a time without generating suspicion. If there is a significant change, such as a processor and display change, the request can be automatically denied, and in some cases the user must re-enter the user's credentials after any such change. In at least some embodiments a provider can provide a set of rules or policies to determine how to handle certain changes, and the amount of allowable changes of certain types for different types of request, etc. The actions can include, for example, allowing or rejecting a request, flagging a request, logging information for a request, notifying a user, and triggering an alarm, among other such options. In at least some embodiments, the number of changes and/or denied requests can be tracked over time, and different or additional actions might be taken in response to such actions, which may be indicative of illicit activity in at least some situations. In some cases, certain IP addresses, device configurations, or other such aspects can be blacklisted such that no requests from corresponding devices will be processed.

As mentioned, in some embodiments a provider can utilize a specific selection and ordering of information for fingerprints for a session, which can rotate or otherwise change over time. In some embodiments, a provider might select a random sampling of information for a given fingerprint, such that a malicious actor will have a harder time determining the appropriate type of information to include in a fingerprint. In such cases the selection and ordering can itself become part of the fingerprint, as a lack of certain information in a fingerprint can be indicative of an invalid fingerprint. In some embodiments a token vendor 208 or other such system can utilize some logic to select information to include in a fingerprint that may be relatively unique for a device. For example, a device running a current version of a popular operating system might not be particularly useful, but a user running a specific older version of that operating system (OS) or having various plug-ins or infrequent settings or options for that OS might be relatively unique and more useful in identifying this particular device. In some embodiments, the number of types of information included in a fingerprint can be based at least in part upon a determined uniqueness of the information provided, as a client device with very unique settings might require only a few setting values to identify the device, while a new computer with factory settings might require a large number of values in the fingerprint to attempt to sufficiently distinguish this device from various other devices.

In some embodiments a Web page provided by a resource provider can include an embedded object or other script operable to provide information about a client device. For example, a page being rendered through a browser application executing on a client device 202 might include a frame or widget that is transparent or very small, such as one pixel by one pixel, that can run in the Flash runtime or other such environment. Such a component can enable the provider to query for various types of information exposed by the client device.

Figure 3:
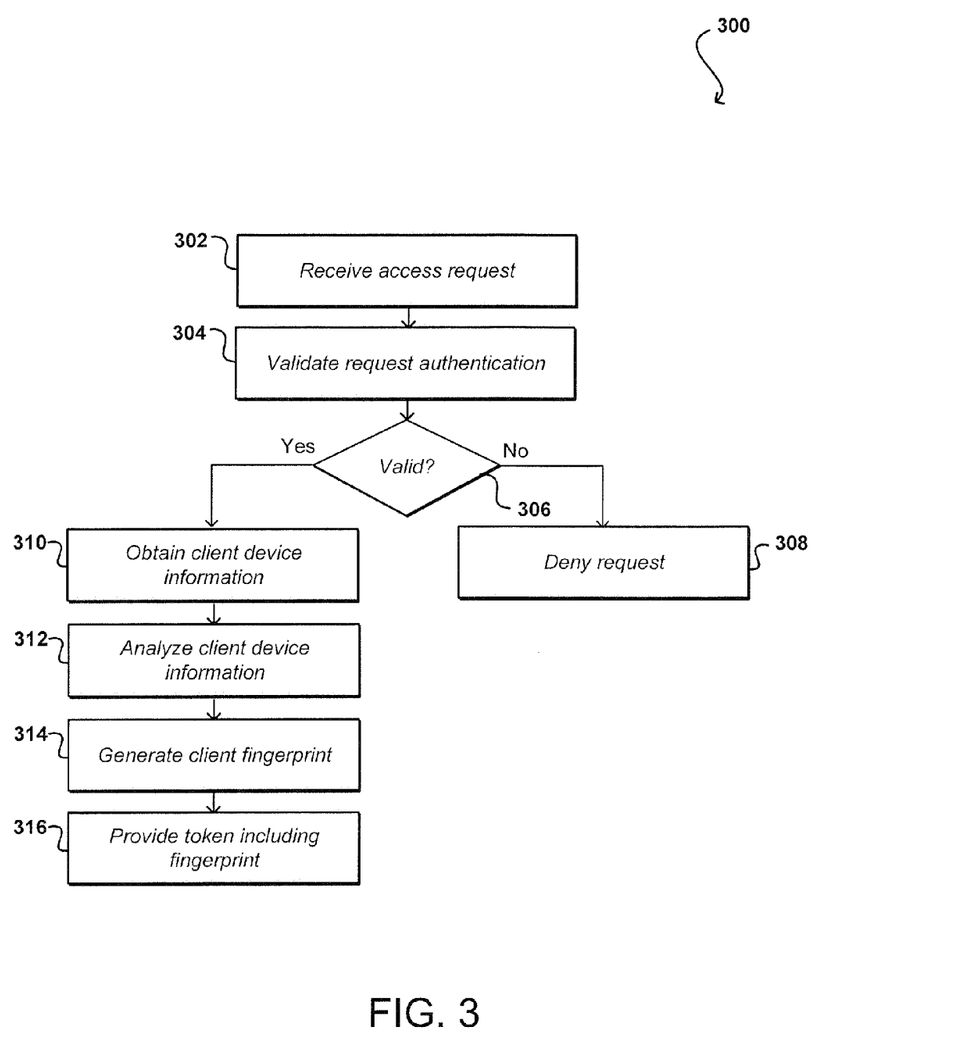
FIG. 3 illustrates an example process for generating a device-specific token that can be used in accordance with various embodiments.

FIG. 3 illustrates an example process 300 for generating a device-specific token that can be used in accordance with various embodiments. It should be understood for this and other processes discussed herein that there can be additional, fewer, or alternative steps, performed in similar or alternative orders, or in parallel, within the scope of the various embodiments unless otherwise stated. In this example an access request is received 302 that includes information useful in authenticating a user. This request can be received, for example, in response to a user entering username and password information into a Web page and selecting a "submit" or similar option, causing the request to be submitted. The information submitted by the user can be analyzed and the authentication for the request validated 304, such as by comparing the username and password combination to a set of username-password pairs stored in a data store for a resource or content provider. If the request authentication is not validated 306, such as where the request is determined to not correspond to a stored username-password pair with access to one or more resources needed to process the request, the request can be denied 308. If the request authentication is validated, information about the client device through which the user is providing the authentication information can be obtained 310. As discussed, the information can be obtained in various ways. In one embodiment, the information could be included with the request. In many embodiments, however, a separate request can be sent to the device to obtain the information, in order to reduce the likelihood of fraudulent requests being processed. The request can include a request for specific information to be used for a fingerprint, or a request for more information than will be used for the fingerprint, in case the request is intercepted by a malicious third party who is attempting to determine which information to include in a fingerprint. Various other options can be utilized as well.

When the information for the client device is obtained, the information can be analyzed 312 to determine information such as the types of information available, uniqueness of various values, and other such information. Based at least in part upon the available information, at least one client-specific fingerprint can be generated 314 for use in authenticating that device. As discussed, the fingerprint can include a string of key-value pairs that are specific to the device, and the selection and ordering of those pairs can be determined using a random approach, various rules or policies, or other such information. The fingerprint can be included in a token that is generated for the session, and the token can be provided 316 to the client device (along with any other session information) for use in submitted subsequent requests on the session.

Figure 4:
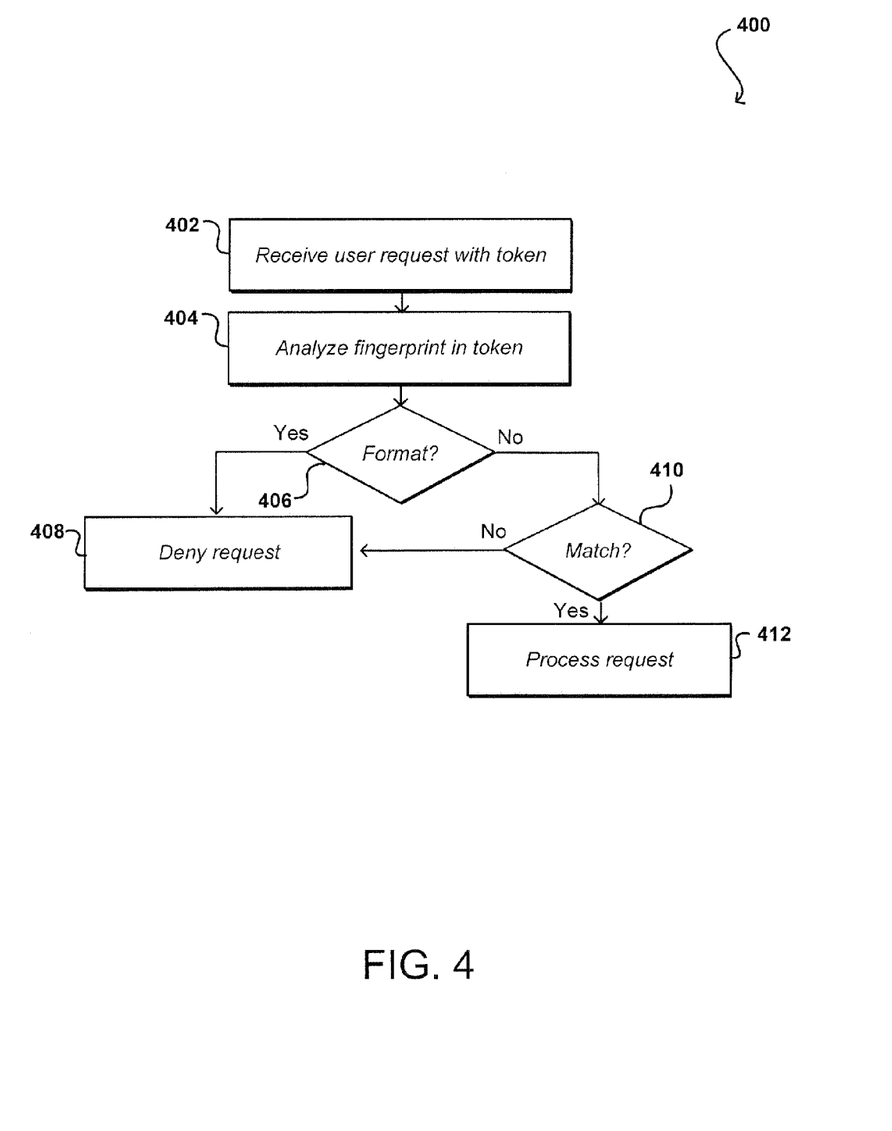
FIG. 4 illustrates an example process for determining whether to process a request based at least in part upon a device-specific token included with the request that can be utilized in accordance with various embodiments.

FIG. 4 illustrates an example process 400 for authenticating a user request using a device-specific token that can be utilized in accordance with various embodiments. In this example a user request is received 402 that includes a token. If a request is received without such a token, the request can be automatically denied when the type of request requires a token to be processed. In other embodiments the user can be instructed to login to the system or otherwise provide credentials for authenticating an identity of the user, which can be used to generate a token for the user. A similar process can be undertaken in the token is determined not to include a valid device fingerprint. If a fingerprint is able to be extracted from the token, and the temporary credential information is otherwise valid, the information for the fingerprint can be analyzed 404, such as to determine the contents, ordering, and values of information in the fingerprint. If the fingerprint is determined 406 to not be in the proper format for the session, the request can be denied 408 for failure to provide adequate authentication. If the fingerprint has the proper format (including selection and ordering of information), the values of the information in the fingerprint can be compared to values obtained from the device. As discussed, this can include sending a separate request to the device to obtain the current information in at least some embodiments. If the information does not match 410 within an acceptable threshold, the request can be denied 408 in at least some embodiments, although other remedial actions can be performed as well, as discussed elsewhere herein. If the information in the fingerprint matches the device information by at least an acceptable amount, the request can be processed 410. For at least certain changes, however, information might be logged or flagged, an alarm raised, a notification sent, or another such action taken where the mismatch in information is potentially suspicious. In some embodiments, any mismatch may require the user to be re-authenticated on the device in its current state. Various other approaches can be utilized as well within the scope of the various embodiments as should be apparent in light of the teachings and suggestions contained herein.

As discussed, different approaches can be implemented in various environments in accordance with the described embodiments. As will be appreciated, although a Web-based environment is used for purposes of explanation in many examples herein, different environments may be used, as appropriate, to implement various embodiments. An electronic client device can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network also can communicate with devices such as a charger (not shown), as discussed herein. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In various examples the network includes the Internet, as the environment includes a Web server for receiving requests and serving content in response thereto, although for other networks an alternative device serving a similar purpose could be used, as would be apparent to one of ordinary skill in the art.

An illustrative environment can also include at least one application server and at least one data store. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing production data and user information, which can be used to serve content for the production side. The data store also is shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIGS. 1 and 2. Thus, the depiction of the system should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method of authenticating a user, comprising:
   under control of one or more computing systems configured with executable instructions,
   receiving an access request;
   in response to validating the access request via an authentication mechanism:
   obtaining initial device-specific information about a computing device from which the access request was received;
   generating a device fingerprint including at least a portion of the initial device-specific information, wherein the device fingerprint includes information indicating an order in which the initial device-specific information is stored in the device fingerprint; and
   providing a token that includes the device fingerprint to the computing device for submission with any subsequent related requests;
   receiving a subsequent request; and
   determining that the subsequent request includes a copy of the token, wherein in response to determining that the subsequent request includes the copy of the token:
   obtaining current device-specific information about a computing device from which the subsequent request was received;
   comparing the portion of the initial device-specific information in the device fingerprint in the copy of the token with the current device-specific information; and
   processing the subsequent request when the device-specific information in the device fingerprint matches the current device-specific information within at least one allowable match threshold.

2. The computer-implemented method of claim 1, wherein the fingerprint includes information about at least one of a version of an operating system, a client software version, a set of operational client features, a set of application plug-ins, and a cookie.

3. The computer-implemented method of claim 1, wherein the at least one allowable match threshold includes at least one of an acceptable order, format, selection, or value of the at least the portion of the initial device-specific information contained in the device fingerprint.

4. The computer-implemented method of claim 1, wherein the subsequent request is processed when the subsequent request further includes valid temporary credentials for a session.

5. The computer-implemented method of claim 1, further comprising:
   signing and encrypting the token before providing the token to the client device.

6. The computer-implemented method of claim 1, further comprising:
   decrypting the token in the subsequent request to extract the device fingerprint.

7. The computer-implemented method of claim 1, wherein the subsequent request is authenticated using a temporary credential for the user placed in the token.

8. The computer-implemented method of claim 1, wherein a temporary credential is only usable with the token when the temporary credential is valid and contained within the token.

9. The computer-implemented method of claim 1, further comprising:
   denying the subsequent request when the current device-specific information does not match the device information in the fingerprint according to the at least one allowable match threshold.

10. The computer-implemented method of claim 1, further comprising:
    denying the subsequent request when the token has expired or the request does not match other information that was included in the token.

11. The computer-implemented method of claim 1, further comprising:
    verifying a validity and integrity of a signature of the token before processing the subsequent request.

12. The computer-implemented method of claim 1, wherein the initial device-specific information in the fingerprint includes information about at least one of a browser type, a browser version, an operating system version, installed software, installed plugins, configuration information, peripheral information, a time zone, a geographic location, display information, and a graphics capability.

13. The computer-implemented method of claim 1, further comprising:
    generating at least one notification for any mismatch between the current device-specific information and the initial device-specific information in the fingerprint.

14. The computer-implemented method of claim 1, further comprising:
    instructing the user to re-authenticate when the user submits a request from a different computing device.

15. A computing device, comprising:
    a processor;
    memory including instructions that, when executed by the processor, cause the computing device to:
    receive an access request;
    in response to validating the access request via an authentication mechanism:
    obtain initial device-specific information about a computing device from which the access request was received;
    generate a device fingerprint including at least a portion of the initial device-specific information, wherein the device fingerprint includes information indicating an order in which the initial device-specific information is stored in the device fingerprint; and
    provide a token that includes the device fingerprint to the computing device for submission with any subsequent related requests;
    receive a subsequent request; and
    determine that the subsequent request includes a copy of the token, wherein in response to determining that the subsequent request includes the copy of the token:
    obtain current device-specific information about a computing device from which the subsequent request was received;
    compare the portion of the initial device-specific information in the device fingerprint in the copy of the token with the current device-specific information; and
    process the subsequent request when the device-specific information in the device fingerprint matches the current device-specific information within at least one allowable match threshold.

16. The computing device of claim 15, wherein the instructions when executed further cause the computing device to:

deny the subsequent request when the current device-specific information does not match the initial device-specific information in the fingerprint within at least one allowable match threshold, the token has expired, or the request does not include valid information.

17. The computing device of claim 15, wherein the instructions when executed further cause the computing device to:
verify a validity and integrity of a signature of the token before processing the subsequent request.

18. The computing device of claim 15, wherein the initial device-specific information in the fingerprint includes at least one of a browser type, a browser version, an operating system version, installed software, installed plugins, configuration information, peripheral information, a time zone, a geographic location, display information, and a graphics capability.

19. The computing device of claim 15, wherein the instructions when executed further cause the computing device to:
perform at least one remedial action for any mismatch between the current device-specific information and the initial device-specific information in the fingerprint.

20. The computing device of claim 19, wherein the at least one remedial action includes notifying a fraud system.

21. A non-transitory computer-readable storage medium including instructions that, when executed by a processor of a computing device, cause the computing device to:
receive an access request;
in response to validating the access request via an authentication mechanism:
obtain initial device-specific information about a computing device from which the access request was received;
generate a device fingerprint including at least a portion of the initial device-specific information, wherein the device fingerprint includes information indicating an order in which the initial device-specific information is stored in the device fingerprint; and
provide a token that includes the device fingerprint to the computing device for submission with any subsequent related requests;
receive a subsequent request; and
determine that the subsequent request includes a copy of the token, wherein in response to determining that the subsequent request includes the copy of the token:
obtain current device-specific information about a computing device from which the subsequent request was received;
compare the portion of the initial device-specific information in the device fingerprint in the copy of the token with the current device-specific information; and
process the subsequent request when the device-specific information in the device fingerprint matches the current device-specific information within at least one allowable match threshold.

22. The non-transitory computer-readable storage medium of claim 21, wherein the token further includes a temporary credential and an expiration date.

23. The non-transitory computer-readable storage medium of claim 21, wherein a subsequent related request is able to be authenticated using a temporary credential when the temporary credential is valid and contained in a token supplied with the subsequent related request.

24. The non-transitory computer-readable storage medium of claim 21, wherein the instructions when executed further cause the computing device to:
digitally sign and encrypt the token before providing the token to the computing device.

25. The non-transitory computer-readable storage medium of claim 21, wherein the instructions when executed further cause the computing device to:
determine at least one of an order or a selection of the portion of the initial device-specific information to be included in the device fingerprint.

26. The non-transitory computer-readable storage medium of claim 25, wherein the order and selection are determined according to at least one selection policy or at random.

27. The non-transitory computer-readable storage medium of claim 26, wherein the at least one selection policy includes logic for selecting initial device-specific information based at least in part on a uniqueness of the initial device-specific information.

28. The non-transitory computer-readable storage medium of claim 21, wherein the initial device-specific information in the fingerprint includes information about at least one of a browser type, a browser version, an operating system version, installed software, installed plugins, configuration information, peripheral information, a time zone, a geographic location, display information, and a graphics capability.

* * * * *